Aug. 13, 1935.   R. L. HASCHE   2,011,551
METHOD OF MANUFACTURING SOLID CARBON DIOXIDE
Filed April 20, 1933
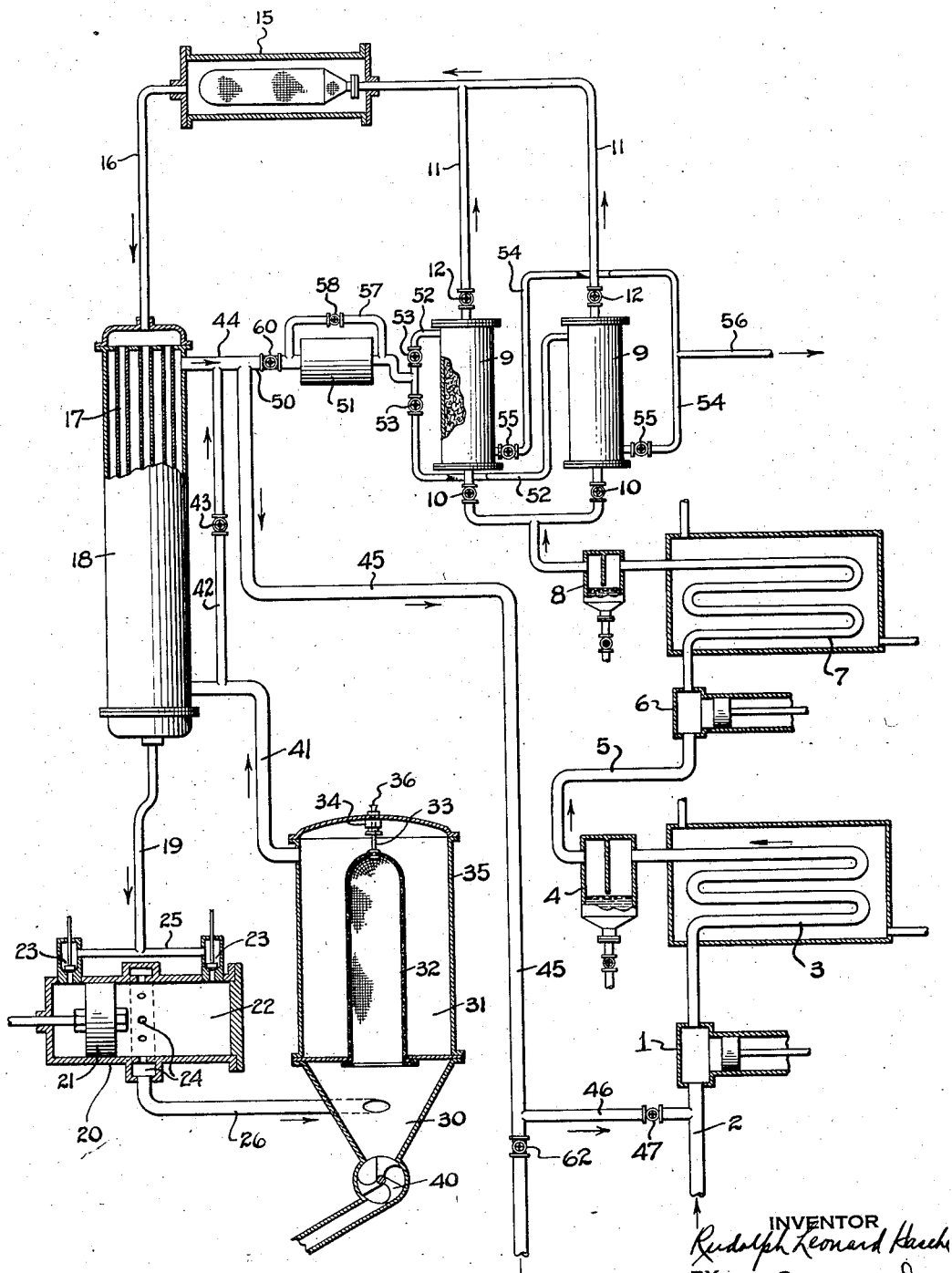
INVENTOR
Rudolph Leonard Hasche
BY
Austin & Dix
ATTORNEYS Patented Aug. 13, 1935

2,011,551

UNITED STATES PATENT OFFICE 2,011,551

METHOD OF MANUFACTURING SOLID CARBON DIOXIDE

Rudolph Leonard Hasche, Milwaukee, Wis., assignor to Carbonic Development Corporation, a corporation of Delaware Application April 20, 1933, Serial No. 666,973

17 Claims. (Cl. 62—170)

This invention relates to the recovery of a constituent from a gas mixture, and more particularly to a low temperature process for the production of solid carbon dioxide from gas mixtures containing carbon dioxide as a constituent.

The invention is particularly applicable to the recovery of carbon dioxide from gases relatively lean in that constituent, for example, from fuel gases produced by the combustion of carbonaceous fuels and having a carbon dioxide content of 8% to 18%, although it may be used for various other concentrations as will be readily apparent. The invention specifically provides for the production of pure solid carbon dioxide, commonly called "dry ice".

In accordance with the present invention, a gaseous mixture containing carbon dioxide is compressed to a pressure such that the partial pressure of the carbon dioxide is below its triple point, i. e. the partial pressure of this constituent is such that on reduction in temperature it passes directly from gaseous to solid state without passing through an intermediate liquid state. At this pressure, the gas is cooled in a continuous manner by heat exchange, preferably in a countercurrent gas to gas exchanger, to a temperature just above the solidification temperature of the carbon dioxide at the pressure involved. The gas is then supplied to an expanding engine, preferably of the uniflow type, in which it is expanded adiabatically with the production of external work, thereby causing the gas to become suddenly cooled to a temperature substantially below the solidification temperature of carbon dioxide at the partial pressure obtaining. A large portion of that constituent then freezes out in the expanding engine in the form of a finely divided solid and is swept out of the engine with the exhaust gases.

This finely divided solid carbon dioxide snow is separated from the gas stream by a filter, preferably of the bag type, and the cold stripped gases are passed in a continuous manner through the heat exchanger to cool the incoming gases in the step above mentioned.

Means may be provided for shaking the filter to remove the carbon dioxide snow from the surface thereof and to permit a continuous operation of the system. The invention also provides suitable lubricating means for the expanding engine which is especially adapted to use at the low temperatures involved without contaminating the final product. Recirculation means is also provided to permit a portion of the stripped gases to be recirculated through the system in cases where the carbon dioxide content is sufficiently high to warrant this procedure. The process is accordingly adaptable to gases having carbon dioxide in various concentrations up to 100% and may be controlled to provide efficient separation and production of solid carbon dioxide in each instance.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out may be better understood by referring to the following description taken in connection with the accompanying drawing forming a part thereof, in which the figure illustrates diagrammatically a system arranged in accordance with the present invention.

In the following description and in the claims, various details will be identified by specific names for convenience, but they are intended to be as generic in their application as the art will permit.

Referring to the drawing, the invention is shown as embodied in a system particularly adapted to gas mixtures containing between 8% and 18% of carbon dioxide, such for example, as flue gas. This gas mixture, which may have previously been freed of objectionable impurities by well known scrubbing or purification methods, enters a compressor 1 comprising a first stage of compression through a pipe 2. After being compressed to a convenient pressure in compressor 1, the gas mixture is passed through a cooler 3 which may, for example, comprise a water cooler adapted to remove the heat of compression. The gas is then passed through a separator 4 in which impurities, such as oil mist, or water which may have condensed in the cooler 3, are removed. The gas is then passed through a pipe 5 into a second compressor 6 forming the second stage of compression, thence through a cooler 7, similar to cooler 3, in which the heat of compression is removed, and through a second separator 8, whereby any impurities which have condensed out of the gas mixture or may be suspended therein are eliminated.

The total pressure to which the gas is raised in the compressor may vary over a considerable range, depending upon the gas concentrations and may vary, for example, from 10–25 atmospheres for dilute gas mixtures. For richer gases, lower pressures are found to be advantageous. For example, a pressure of 5 atmospheres is found to be a very economical pressure. The total pressure is such that efficient operation of the expanding engine, to be described, may be obtained by expansion of the gases therein. In any event, the pressure is such that the partial pressure of the carbon dioxide is below the triple point thereof which occurs at a pressure of 5.11 atmospheres and at a temperature of $-69.9°$ F., i. e. the partial pressure of the carbon dioxide is such that on subsequent cooling the gas will pass directly into the solid form without passing through an intermediate liquid phase. The compression may take place in a single stage if such procedure is found to be convenient. Two stages have been shown merely for purposes of illustration.

The gas mixture, after being compressed as above mentioned, is applied to one of a pair of beds 9 of adsorbent material, such as silica gel or activated alumina or the like, valves 10 being utilized to selectively pass the gas through one or the other of said beds. The adsorbent material is adapted to dry the gaseous mixture to such a degree that water ice, or frost, does not freeze out in the subsequent heat exchange mechanism and is also adapted to remove certain impurities, such as sulphur compounds and aldehydes, which may be present in the gas. Impurities that pass the adsorbent material will be at sufficiently low partial pressures to prevent their condensation in subsequent cooling stages.

The gases leave the beds 9 through pipes 11 which are controlled by valves 12 and are passed through a filter 15 of any desired type, for example, a bag filter which is adapted to remove dust particles or impurities such as particles of adsorbent material. Thence, the gases pass through a pipe 16 downwardly through the tubes 17 of a gas to gas heat exchanger 18. In the exchanger, the gas is cooled to a temperature just above the solidification temperature of the carbon dioxide at the partial pressure of that constituent. For example, in a gas containing 10% carbon dioxide by volume and compressed to a total pressure of 20 atmospheres absolute, the solidification temperature of the carbon dioxide is $-94°$ F. This temperature, in other words, corresponds to the vapor pressure of carbon dioxide at two atmospheres pressure, which constitutes the partial pressure of the carbon dioxide in the above example.

In the interest of efficiency, it is desirable to cool the gas as nearly to the solidification temperature as possible. The gas in the example given above may be cooled to a temperature of $-90°$ F. which is only four degrees removed from its solidification temperature. Conversely, it is desirable for continuous and uniform operation to prevent deposition of solid carbon dioxide in the exchanger. Consequently, the gas must not be cooled in the exchanger below the solidification temperature.

Leaving the exchanger, cooled as above mentioned, the gases are passed through a pipe 19 to an expanding engine 20 which is preferably of the uniflow type having a piston 21 operating in a cylinder 22 having inlet ports 23 at the ends and central exhaust ports 24. The gases may be applied to the inlet ports through inlet manifolds 25 and may be removed from the exhaust ports through pipe 26.

In the engine 20, the gas is expended adiabatically with the production of external work. The expansion may be carried to approximately atmospheric pressure. During this sudden expansion, the gas mixture is cooled to a very low temperature, i. e. to a temperature well below the solidification point of the carbon dioxide at the partial pressure of this constituent as it exists during the expansion stroke of the engine, for example, to temperatures of $-140°$ F. and $-180°$ F. As a result of this sudden cooling, a substantial part of the carbon dioxide is solidified as a finely divided solid or snow which is carried out of the expanding engine in suspension in the exhaust gases.

The uniflow type of engine is particularly adapted for this purpose inasmuch as the central exhaust ports 24, which are spaced around the cylinders, allow the snow to be carried out of the cylinders without coming in contact with the valve mechanism and without seriously impeding the operation of the piston. The uniflow engine also possesses the characteristic of being capable of operating efficiently against back pressures, such as those encountered in the present process.

While the expanding engine has been disclosed as of the reciprocating type, it is obvious that various other types may be employed depending upon the size of the plant and upon the particular considerations involved. The above type has been disclosed merely for purposes of illustration.

The expanding engine may be of the type disclosed in Hasche and Perkins application Serial No. 498,766, filed November 29, 1930.

In order to cause the expanding engine to operate efficiently at the temperatures involved, it is desirable to introduce a lubricant, such as a low boiling liquid having a melting point well below the expansion temperatures which may be encountered in the engine. The lubricant must also have a vapor pressure sufficiently high at the sublimation temperature of the solid carbon dioxide, i. e. $-110°$ F. so that the portion of the lubricant which carries over with the product will entirely vaporize with the solid carbon dioxide and leave no residue. This is especially desirable in cases where the solid carbon dioxide is to be used for refrigeration purposes.

It has been found that pentane is particularly suitable for the above purpose. Pentane has a melting point of $-204°$ F. which is safely below the usual expansion temperatures above mentioned. Certain other substances having similar properties may also be used, such for example, diethyl ether and the like. Ether may possess certain advantages, if the solid carbon dioxide is to be subsequently liquefied. In any event, the lubricant may be added with the inlet gases or through a suitable lubricating device (not shown) which may be either of the gravity flow or pressure type.

Leaving the expanding engine through pipe 26, the expanded gases and suspended carbon dioxide snow passes at high velocity into a hopper 30 of a snow chamber 31. The pipe 26 preferably enters the hopper 30 at a tangent so that the gases entering the hopper tangentially are caused to rotate therein and do not directly cross the path of the separated solid falling from the filter to be described.

The gases from hopper 30 pass upwardly through a filter 32, which is preferably of the bag type and may comprise a cloth, chamois, finely woven metal fabric or the like, which is adapted to separate the solid carbon dioxide from the gas. The filter is maintained in inverted position and is preferably sufficiently flexible so that the pulsations in pressure at the exhaust of the expanding engine cause the filter to shake or vibrate and thereby assist in dislodging the separated solid from the surface thereof. Auxiliary shaking means may, however, be employed, as for example, a rod 33 which may be secured to the filter 32 and extended through a suitable packing gland 34 in housing 35 of the snow chamber 31. This rod 33 may terminate in a surface 36 which is adapted to be engaged by a mechanical hammer, cam arrangement or the like (not shown) by which the rod is vibrated and shaking of the bag 32 is effected. The bag type filter is particularly advantageous for the above purpose inasmuch as it provides a large surface area, adapted to diminish the gas resistance in the system and at the same time may be enclosed in a chamber of relatively small cross sectional area. This latter feature permits the chamber to be readily heat insulated as may be required by reason of the low temperatures involved.

The carbon dioxide snow, which is collected at the bottom of hopper 30, may be removed by suitable means, such as a conveyor 40 and may be passed either continuously or intermittently to hydraulic presses (not shown) for briquetting. It is to be noted that the carbon dioxide thrown down in the snow chamber is considerably below the sublimation temperature of carbon dioxide at atmospheric pressure. Hence, the loss in briquetting and pressing, due to evaporation, is considerably reduced. The conveyor 40 is preferably so arranged that escape of exhaust gases is prevented.

Leaving the outside compartment of the snow chamber 31 through pipe 41, the stripped gases are passed around tubes 17 of the exchanger 18 in a direction counter-current to the flow of the incoming gases and provide a source of refrigeration for cooling the incoming gases as aforesaid. A bypass 42, controlled by valve 43, is provided to control the portion of the stripped gases passed through the exchanger and to thereby vary the amount of refrigeration and the resultant temperature of the incoming gases as they leave the exchanger. It has been found that in a gas to gas exchange, a countercurrent heat exchanger can operate continuously with a large temperature differential being maintained at the cold end without causing the carbon dioxide to freeze out on the tubes of the hot gas compartment due to irregular local cooling.

For example, the compressed gases were cooled to a temperature of −90° F., as above mentioned, at a partial pressure such that the carbon dioxide would solidify at −94° F. The cold expanded gases entered the exchanger at −170° F. without producing any local freezing of the carbon dioxide. This feature, together with the use of adsorbent beds 9 ahead of the exchanger to remove impurities and moisture from the compressed gases, makes it possible to carry out the heat exchange in a continuous process without shutting down to remove solidified carbon dioxide or frost from the pipes of the exchanger.

The stripped gases leave the exchanger 18 through a pipe 44 and may be used to reactivate the beds 9 of adsorbent material or may be discharged through a pipe 45, or a portion thereof may be recirculated through a pipe 46 which enters pipe 2 ahead of compressor 1, said pipe 46 being controlled by a valve 47. For reactivation purposes, the gases are passed through pipe 50 to a heater 51 and thence through pipes 52, controlled by valves 53, to one of the beds 9 of adsorbent material. The gases are removed from said beds through pipes 54, controlled by valves 55, and may be discharged through pipe 56. By-pass 57 is provided for the heater 51 which by-pass is controlled by valve 58.

The stripped gases are especially suitable for reactivation inasmuch as the impurities and moisture have been completely removed therefrom. They may accordingly be heated by means of the heater 51 and applied to one of the beds 9 for reactivation purposes by suitable control of valves 53 and 55, the particular bed being at the time cut out of service by means of valves 10 and 12. After reactivation the bed may be pre-cooled if desired, by bypassing the gases around the heater 51 through bypass 57. A valve 60 may be employed to control the proportions of the gases passing through the reactivation system. A valve 62 may also be used to control the proportions of gases discharged from the system.

A portion or all of the stripped gases may be also applied to the exchanger (not shown) for the purpose of cooling incoming compressed gases following the separator 8.

It may be desirable to recirculate a portion of the stripped gases through pipe 46 where the incoming gases are comparatively rich in carbon dioxide and substantial amounts still remain in the stripped gases. Recirculation is also advantageous since the stripped gases are dry and at a temperature of 15° F. to 30° F. and hence produce a saving in power in the first compression stage by pre-cooling the incoming gases. In the case of operation with a pure carbon dioxide gas, all of the unsolidified gas is recirculated.

It will be noted that in the above described system, the pure product is obtained in a solid form without requiring chemical treatment for subsequent purification. This product is obtained partly by reason of the removal of impurities in the beds 9 of adsorbent material and partly by reason of the omission of the liquid stage in the solidification process. Liquid carbon dioxide adsorbs impurities at a much more rapid rate than solid carbon dioxide. Hence, by preventing the gas from passing through the liquid stage, the adsorption of impurities thereby is greatly reduced.

As a further advantage, it is to be noted that the process is continuously carried out and that the cooling in the heat exchanger is carried to a point just above the solidification temperature of the carbon dioxide while at the same time the temperature is prevented from falling below this point sufficiently to cause the carbon dioxide to freeze out on the tubes of the exchanger. By this means a rapid and complete freezing of carbon dioxide snow is obtained in the expanding engine at temperatures sufficiently below the sublimation temperature of carbon dioxide to prevent appreciable loss of that substance during subsequent briquetting or pressing. The lubricant above mentioned permits the expanding engine to operate efficiently at the low temperatures involved and does not introduce impurities in the final product.

For convenience of description the invention has been specifically disclosed as embodied in a process for the production of solid carbon dioxide from lean gases, such as fuel gases. Specific temperatures and pressures have also been specified. It is understood, however, that the invention is not to be limited to these specific features, but may be applied to other gas mixtures having similar properties and that the temperatures and pressures involved will vary according to the gases and the gas concentrations as will be readily apparent to a person skilled in the art.

It is also obvious that various changes and modifications may be made in the process without departing from the spirit of the present invention which is to be limited only in accordance with the following claims when interpreted in view of the prior art.

What is claimed is:

1. A continuous process for separating a gas from a gas mixture containing said gas as a constituent which comprises continuously passing the mixture under pressure through a heat exchanger to cool the same to a predetermined temperature, expanding adiabatically the gases thus cooled with the production of external work to materially lower the temperature of the mixture to a point such that a substantial portion of said constituent separates in non-gaseous form, removing the constituent thus separated and continuously passing the stripped gases through said heat exchanger in a direction exclusively countercurrent to the incoming gases whereby said stripped gases serve as the cooling medium in the step above mentioned.

2. The continuous method of separating carbon dioxide from a gas mixture containing the same as a constituent which comprises raising the partial pressure of the carbon dioxide to a point such that, upon subsequent cooling at said pressure to a predetermined temperature, the carbon dioxide passes directly from the gaseous to the non-gaseous state, cooling the mixture at said pressure to said predetermined temperature by continuously passing said mixture through a heat exchanger, expanding adiabatically the gases thus cooled with the production of external work to cool the mixture well below said predetermined temperature whereby a substantial portion of said carbon dioxide separates in non-gaseous form, removing the carbon dioxide thus formed and continuously passing the stripped gases through said heat exchanger exclusively countercurrently to the incoming gases whereby the stripped gases serve as a refrigerant for incoming gases in the step above mentioned.

3. The continuous method of producing solid carbon dioxide from a gas mixture containing carbon dioxide as a constituent which comprises compressing the mixture to a pressure such that the partial pressure of the carbon dioxide is below its triple point, whereby upon subsequent cooling at said pressure the carbon dioxide passes directly from the gaseous to the solid state, cooling the mixture at said pressure to a temperature just above the solidification point of said carbon dioxide at the partial pressure obtaining by continuously passing said mixture through a heat exchanger, expanding adiabatically the gases thus cooled with the production of external work to materially lower the temperature of the mixture, whereby the carbon dioxide is cooled well below its solidification point and a substantial portion thereof solidifies in the form of a finely divided solid, removing the solid thus formed and continuously passing the stripped gases through said heat exchanger exclusively countercurrently to the incoming gases whereby the stripped gases serve as a refrigerant for incoming gases in the step above mentioned.

4. A system for the separation and solidification of a constituent from a gas mixture containing said gas as a constituent which comprises compressing means adapted to compress said mixture to a pressure such that, on cooling, the constituent passes directly from the gaseous to the solid state, a refrigerant heat exchange device consisting exclusively of a countercurrent heat exchanger, means passing said mixture, thus compressed, through said heat exchanger, means passing cold gases countercurrently through said exchanger for refrigerating purposes, an expanding engine, means applying the refrigerated gases to said expanding engine and causing said gases to be expanded therein adiabatically with the production of external work, the expansion being adapted to cause a substantial portion of said constituent to separate out as a finely divided solid and to be swept out of said engine along with the exhaust gases, a separating device connected to the exhaust of said engine to remove said solid from said exhaust gases, means for supplying said exhaust gases to said heat exchanger for refrigerating purposes in the step aforesaid.

5. The method of separating a gas from a gas mixture containing said gas as a constituent which comprises compressing said gas mixture to a pressure such that the partial pressure of said gaseous constituent is below its triple point, whereby upon subsequent cooling said constituent will pass directly from the gaseous into the solid state, cooling said gas mixture to a temperature just above the solidification temperature of said constituent at the pressure involved, expanding said gas mixture adiabatically with the production of external work, whereby the temperature of said mixture is cooled to a temperature below the solidification temperature of said constituent at the pressure involved and said constituent is caused to separate out as a finely divided solid, causing said solid to discharge from said engine along with the exhaust gases, separating said solid from said exhaust gases, utilizing the stripped gases for pre-cooling the incoming gases in the step aforesaid and recirculating a portion of the stripped gases, after the pre-cooling step, together with additional incoming gases in the process above defined.

6. The method of making solid carbon dioxide which comprises compressing a mixture of carbon dioxide and other gases to give a partial pressure of the carbon dioxide below the triple point, passing the compressed mixture continuously through a heat exchanger, cooling the mixture in said heat exchanger to a temperature just above the solidification temperature of the carbon dioxide at the said partial pressure, expanding the gas mixture, thus cooled, adiabatically with the production of external work to materially lower the temperature of the compressed mixture of gases causing the carbon dioxide to solidify, separating the solid carbon dioxide from the unsolidified gas, feeding the stripped unsolidified gas back to said heat exchanger to cool the incoming mixture as aforesaid and to maintain continuously the temperature of the mixture leaving the exchanger just above the solidification temperature of the carbon dioxide.

7. The method of making solid carbon dioxide which comprises compressing a mixture of carbon dioxide and other gases to give a partial pressure of the carbon dioxide below the triple point, removing the moisture from the compressed mixture, passing the mixture continuously through a heat exchanger, cooling the mixture in said heat exchanger to a temperature just above the solidification temperature of the carbon dioxide at the said partial pressure, expanding the mixture of gases, thus cooled, adiabatically with the production of external work in a reciprocating expansion engine to materially lower the temperature of the compressed mixture of gases causing the carbon dioxide to solidify in the cylinder of the engine, filtering the exhaust of said engine at substantially atmospheric pressure to separate out the carbon dioxide, feeding the stripped unsolidified gases back to said heat exchanger to cool the incoming mixture as aforesaid to maintain continuously the temperature of the gases leaving the heat exchanger just above the solidification temperature of the carbon dioxide.

8. A system for the separation and solidification of a constituent from a gas mixture containing said gas as a constituent which comprises compressing means adapted to compress said mixture to a pressure such that, on cooling, the constituent passes directly from the gaseous to the solid state, a refrigerant heat exchange device consisting exclusively of a countercurrent heat exchanger, means passing said mixture, thus compressed, through said heat exchanger, means passing cold gases countercurrently through said exchanger for refrigerating purposes, an expanding engine, means applying the refrigerated gases to said expanding engine and causing said gases to be expanded therein adiabatically with the production of external work, the expansion being adapted to cause a substantial portion of said constituent to separate out as a finely divided solid and to be swept out of said engine along with the exhaust gases, a filter adapted to remove said solid from said exhaust gases, means to shake said filter, and means to supply said exhaust gases to said heat exchanger for refrigerating purposes.

9. The method of making solid carbon dioxide which comprises compressing gaseous carbon dioxide to a partial pressure of the carbon dioxide below the triple point, passing the compressed gas continuously through a heat exchanger, cooling the mixture in said heat exchanger to a temperature just above the solidification temperature of the carbon dioxide at the said pressure, expanding the gas mixture thus cooled adiabatically with the production of external work to materially lower the temperature of the compressed gas causing the carbon dioxide to solidify, separating the solid carbon dioxide from the unsolidified gas, feeding the stripped unsolidified gas to said heat exchanger to cool the incoming mixture as aforesaid and to maintain continuously the temperature of the mixture leaving the exchanger just above the solidification temperature of the carbon dioxide.

10. The method of making solid carbon dioxide from a substantially pure carbon dioxide gas which comprises compressing the pure carbon dioxide gas to a pressure below the triple point, cooling the compressed gas to a temperature above the solidification temperature of the carbon dioxide and expanding the cooled gas adiabatically with the production of external work to materially lower the temperature of the gas causing the gas to solidify, and removing the solid carbon dioxide.

11. The process for producing solid carbon dioxide from a gas which comprises passing the gas through a heat exchanger to refrigerate said gas, feeding the refrigerated gas to an expansion engine to cause said engine to do external work, said gas expanding adiabatically in said engine and causing solid carbon dioxide to form therein, causing the solid carbon dioxide to be swept out of the engine along with the exhaust gases, separating the solid carbon dioxide from the exhaust gases, passing the stripped exhaust gases through said heat exchanger exclusively countercurrently to the incoming gases and controlling the refrigeration in said exchanger by variably bypassing a part of said stripped gases so as to cool the incoming gases to a temperature just above the solidification point of the carbon dioxide at the discharge end of the exchanger.

12. The process for producing solid carbon dioxide from a gas having a suitable temperature and pressure which comprises adiabatically expanding said gas in a uniflow expanding engine to do external work, said expansion being carried to such lower pressure and temperature that the cooling produced thereby causes the carbon dioxide to solidify in a finely divided state within the engine, and carrying out the solid carbon dioxide along with the exhaust gases from the engine.

13. The process for producing solid carbon dioxide from a mixture of gases which comprises compressing said mixture to give a partial pressure of the carbon dioxide below the triple point, refrigerating the compressed gas, adiabatically expanding the refrigerated compressed gas in an expanding engine with the production of external work to cause the solid carbon dioxide to solidify in a finely divided state within the engine, and carrying out the solid carbon dioxide along with the exhaust gases from the engine.

14. The process of forming solid carbon dioxide from gases containing carbon dioxide as a constituent which comprises compressing said gases to a pressure such that the partial pressure of the carbon dioxide is below its triple point, passing said gases through beds of adsorbent material to remove moisture therefrom, cooling said gases to a temperature just above the solidification temperature of carbon dioxide, expanding the gases adiabatically to further cool the same and to cause carbon dioxide to separate in the form of a finely divided solid, utilizing the cold stripped gases as a refrigerant for cooling further quantities of compressed gases in the step above mentioned and thereafter utilizing the stripped gases for reactivation of the adsorbent material.

15. The process of forming solid carbon dioxide from gases containing carbon dioxide as a constituent which comprises compressing said gases to a pressure such that the partial pressure of the carbon dioxide is below its triple point, passing said gases through beds of adsorbent material to remove moisture therefrom, cooling said gases to a temperature just above the solidification temperature of carbon dioxide, expanding the gases adiabatically to further cool the same and causing carbon dioxide to separate in the form of a finely divided solid, utilizing the cold stripped gases as a refrigerant for cooling further quantities of compressed gases in the step above mentioned and thereafter warming said stripped gases and applying the same to one of said beds of adsorbent material for reactivation and then applying cold stripped gases to said bed to recool the same.

16. The method of making solid carbon dioxide which comprises compressing a mixture of carbon dioxide and other gases to give a partial pressure of the carbon dioxide below the triple point, passing the compressed mixture continuously through a heat exchanger, cooling the mixture in said heat exchanger to a temperature just above the solidification temperature of the carbon dioxide at the said partial pressure, expanding the gas mixture, thus cooled, adiabatically with the production of external work to materially lower the temperature of the compressed mixture of gases causing the carbon dioxide to solidify, separating the solid carbon dioxide from the unsolidified gas, feeding the stripped unsolidified gas back to said heat exchanger to cool the incoming mixture as aforesaid and to maintain continuously the temperature of the mixture leaving the exchanger just above the solidification temperature of the carbon dioxide.

17. The method of making solid carbon dioxide which comprises compressing a mixture of carbon dioxide and other gases to give a partial pressure of the carbon dioxide below the triple point, removing the moisture from the compressed mixture, passing the mixture continuously through a heat exchanger, cooling the mixture in said heat exchanger to a temperature just above the solidification temperature of the carbon dioxide at the said partial pressure, expanding the mixture of gases, thus cooled, adiabatically with the production of external work in a reciprocating expansion engine to materially lower the temperature of the compressed mixture of gases causing the carbon dioxide to solidify in the cylinder of the engine, filtering the exhaust of said engine at substantially atmospheric pressure to separate out the carbon dioxide, feeding the stripped unsolidified gases back to said heat exchanger to cool the incoming mixture as aforesaid to maintain continuously the temperature of the gases leaving the heat exchanger just above the solidification temperature of the carbon dioxide.

RUDOLPH LEONARD HASCHE.